Dec. 19, 1967 H. PENNELL 3,359,052
SOAP CAKE HOLDER AND DISPENSER
Filed March 11, 1966 3 Sheets-Sheet 1
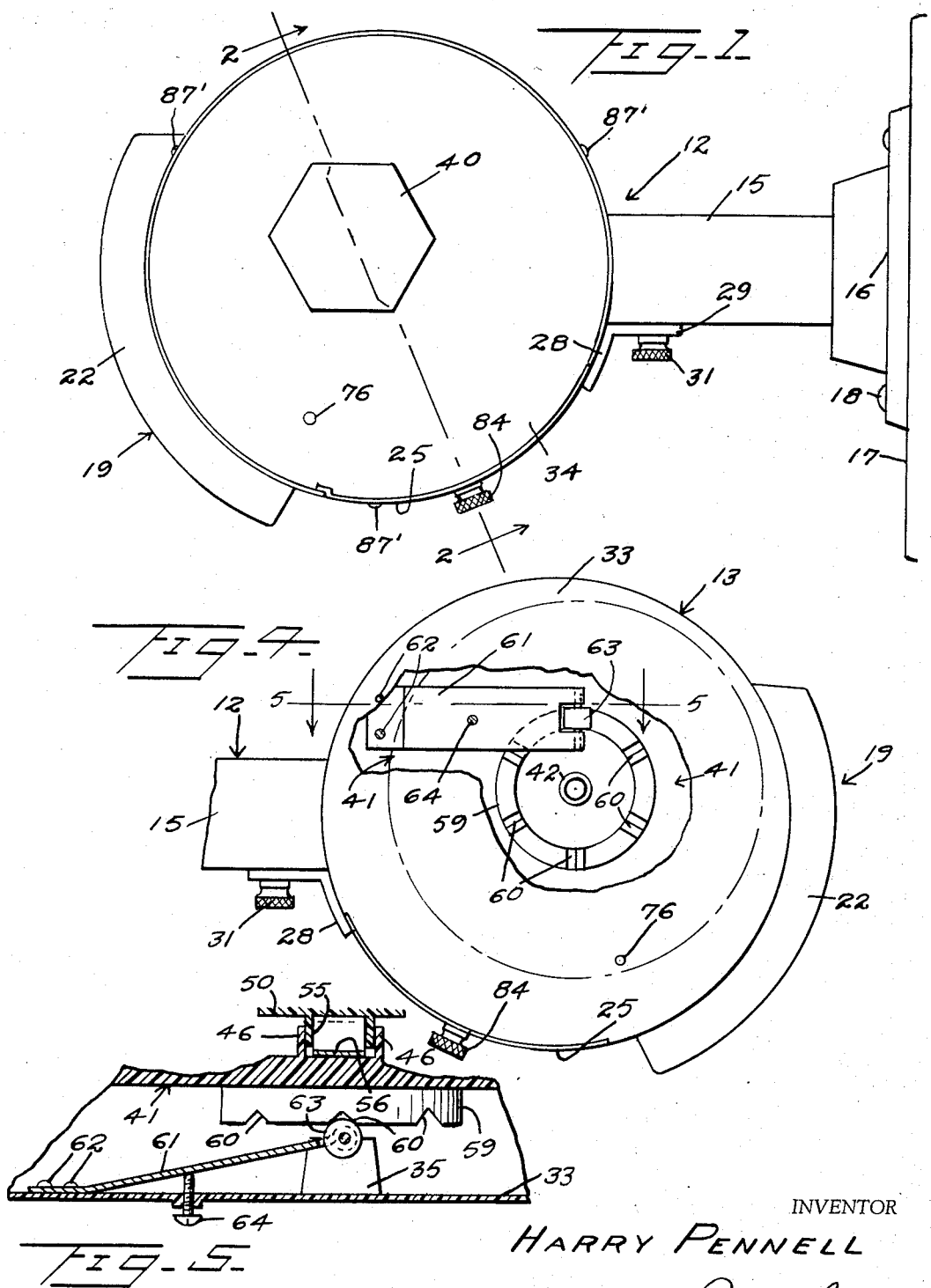
INVENTOR
HARRY PENNELL
BY John N. Randolph
ATTORNEY

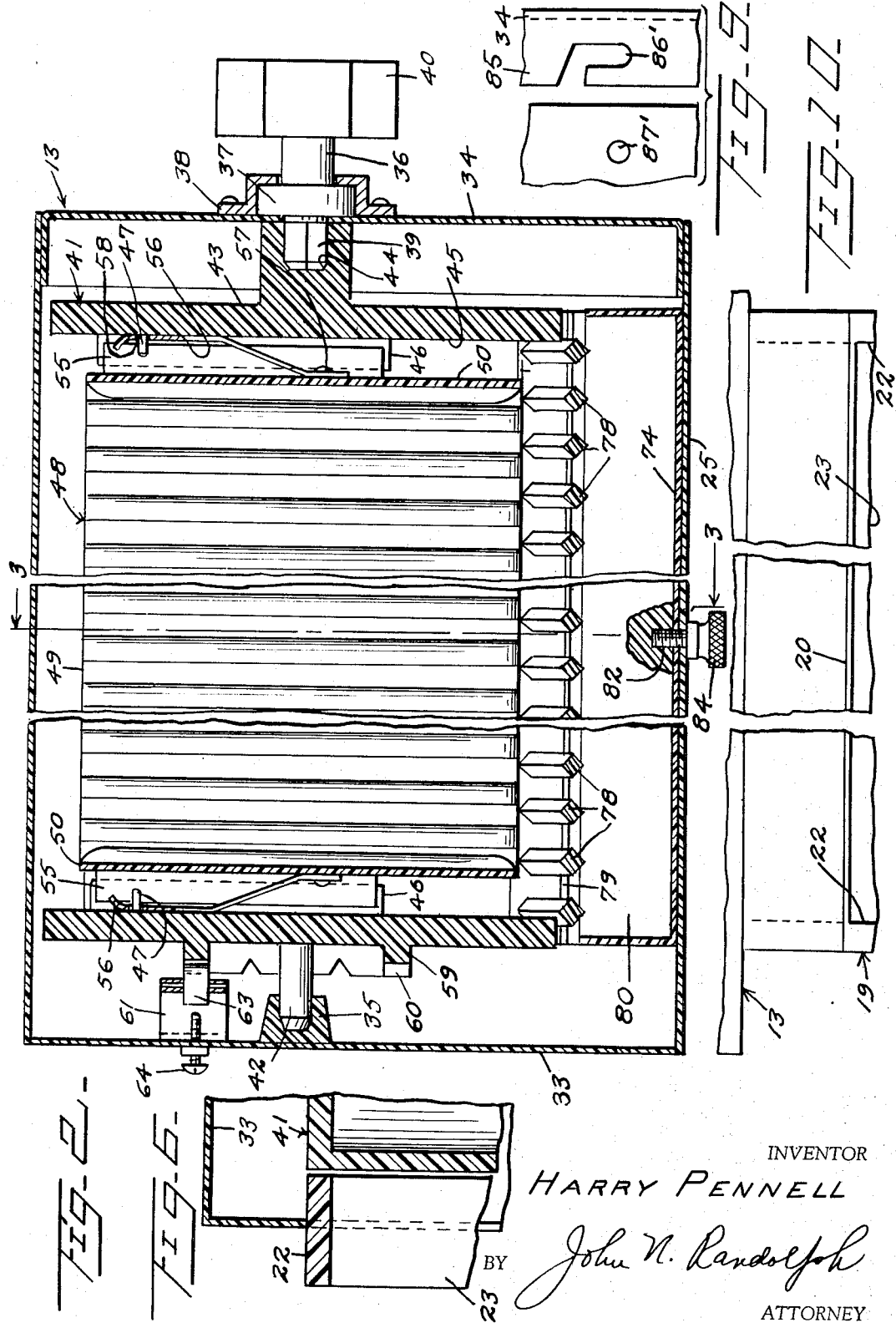

Dec. 19, 1967  H. PENNELL  3,359,052
SOAP CAKE HOLDER AND DISPENSER
Filed March 11, 1966  3 Sheets-Sheet 3
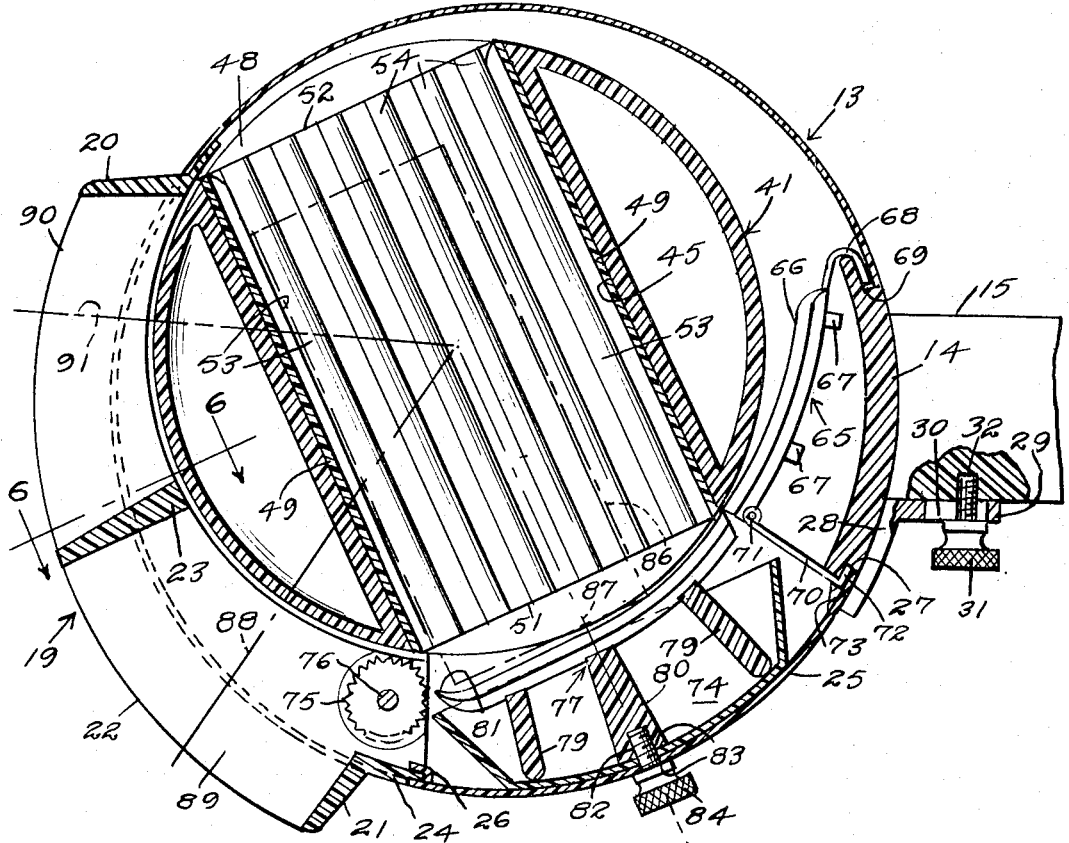
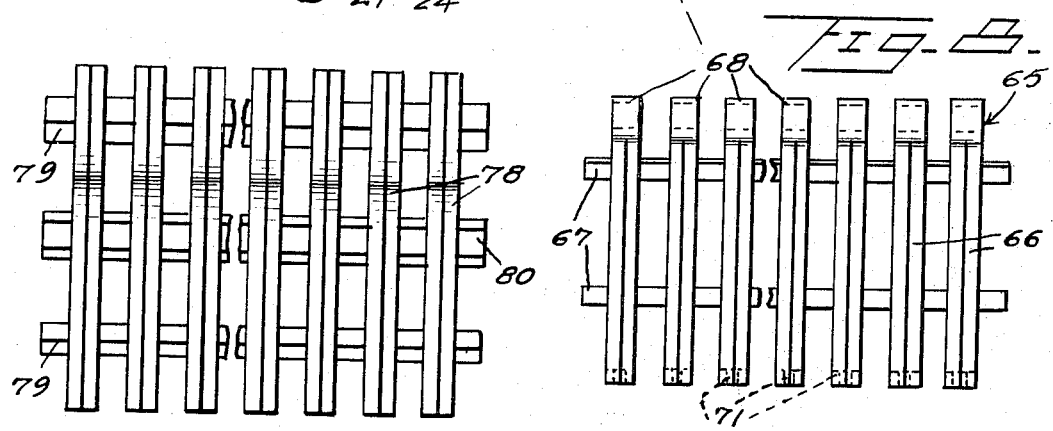
INVENTOR
HARRY PENNELL
BY John N. Randolph
ATTORNEY United States Patent Office 3,359,052
Patented Dec. 19, 1967

3,359,052
SOAP CAKE HOLDER AND DISPENSER
Harry Pennell, P.O. Box 584, Oakland, Calif. 94604
Filed Mar. 11, 1966, Ser. No. 533,492
8 Claims. (Cl. 312—229)

ABSTRACT OF THE DISCLOSURE

A holder and dispenser for cake or bar soap, including a rotatable part in which the soap is contained and which is movable from a position for storing the soap, when not in use, to a position for discharging the soap by gravity from the holder, and then to a third position for return of the soap to the holder after use. A drainage receptacle of the holder receives moisture draining from the soap in it's stored position.

---

This invention relates to a novel holder and dispenser for a cake or bar of soap, and has for its primary object to provide a device for holding a cake of soap so that moisture will drain therefrom to prevent the cake of soap from dissolving, while not in use, as frequently occurs when a cake of soap is stored in a soap dish in which moisture has accumulated.

More particularly, it is an object of the invention to provide a holder having a rotatable inner part, manually rotated in one direction through an arc of 60° from a holding position, in which the soap cake is stored in a concealed position with the holder, to a discharging position in which the soap cake is discharged by gravity for use, and which inner part is thereafter rotated in the same direction another one-sixth of a revolution to a loading position in which the soap cake can be replaced in the holder, after which said inner part is again turned one-sixth of a revolution in the same direction to reposition the soap cake back in its first mentioned stored position, concealed within the holder, and in which stored position moisture will drain from the soap cake and be collected in a moisture collecting receptacle of the holder.

Another object of the invention is to provide a soap cake holder which may be made very attractive in appearance for use in bathrooms, kitchens and washrooms.

A further object of the invention is to provide a soap cake holder and dispenser which may be partially dismantled quickly and easily for cleaning the holder to be maintained in a clean and sanitary condition.

Still another object of the invention is to provide a holder which is so constructed that a cake of soap will not adhere thereto to insure gravity discharge of the soap cake therefrom when a movable part of the holder is rotated to a soap cake dispensing position.

Various other objects and advantages of the invention will hereinafter become more fully apparent from the following description of the drawings, illustrating a presently preferred embodiment thereof, and wherein:

FIGURE 1 is a side elevational view of the holder and dispenser;

FIGURE 2 is an enlarged sectional view thereof, taken substantially along the line 2—2 of FIGURE 1;

FIGURE 3 is a cross sectional view, partly broken away, taken substantially along the line 3—3 of FIGURE 2;

FIGURE 4 is a fragmentary side elevational view, partly broken away, and looking in the opposite direction of FIGURE 1;

FIGURE 5 is an enlarged fragmentary sectional view taken substantially along the line 5—5 of FIGURE 4;

FIGURE 6 is a fragmentary substantially radial sectional view taken substantially along a plane as indicated by the line 6—6 of FIGURE 3;

FIGURE 7 is a fragmentary top plan view of a part of the holder and dispenser, shown detached;

FIGURE 8 is a fragmentary front elevational view of another part thereof, shown detached;

FIGURE 9 is an enlarged fragmentary elevational view showing portions of the holder and dispenser detached from one another, and FIGURE 10 is a fragmentary top plan view of a portion of the outer casing of the holder and dispenser.

Referring more specifically to the drawings, the soap cake holder and dispenser in its entirety is designated generally 12 and includes a substantially cylindrical casing 13 as seen in FIGURE 3, formed in part by a reinforcing member 14 of arcuate cross section which extends substantially from end-to-end of the casing 13 and which is formed on the outer end of a bracket arm 15. As seen in FIGURE 1, the bracket arm 15 has a mounting plate 16 at its opposite end which is adapted to be secured to a vertical surface, such as a wall 17, by fastenings 18, so that the bracket arm 15 extends outwardly from said wall and is disposed in a plane nearly perpendicular thereto.

As seen in FIGURE 3, the member 14 constitutes a rear portion of the casing 13. A frame 19 constitutes a front portion of the casing 13 and extends nearly from end-to-end thereof. The frame 19 includes a top wall 20, a bottom wall 21, end walls 22 and a longitudinal partition wall 23 which is disposed substantially midway between the walls 20 and 21 and which extends to the end walls 22.

The pottom wall 21 has a flange 24 which is disposed substantially concentric with the member 14. An elongated plate 25 of arcuate cross section forms a removable bottom portion of the casing 13 and extends substantially from end-to-end thereof. One longitudinal edge of the plate 25 has an outwardly opening channel 26 to receive a longitudinal edge of the flange 24 for detachably connecting the plate 25 thereto. The other longitudinal edge of the plate 25 fits into a recess 27 in the outer side and bottom edge of the member 14. A clamping member 28 bears against the bottom plate 25 on its outer side and along said last mentioned longitudinal edge thereof for retaining the plate 25 in an applied position, as seen in FIGURE 3. The clamp 28 has a straight portion 29 which bears against the underside of the arm 15 and which is provided with a longitudinal slot 30 to receive the threaded shank of a thumb screw 31 which engages a threaded socket 32 of the arm 15 for securing the clamp 28 in its operative position of FIGURE 3.

As seen in FIGURE 2, the outer casing 13 has a fixed end wall 33 and a removable end wall 34. End wall 33 has a bearing 35 on its inner side. A stem 36 extends through the end wall 34 and has an enlarged circular portion 37, intermediate of its ends, which is journaled in a collar 38 which is secured to the outer side of the end wall 34. Stem 36 has an inner portion 39 of non-circular cross section which is disposed internally of the wall 34. A knob 40 is fixed to the outer end of the stem 36 and is disposed externally of the wall 34.

The casing 13 contains a cylinder, designated generally 41, having a stub shaft 42 projecting from one end thereof and a casting 43 which projects from its opposite end and which has a socket 44 of non-circular cross section opening outwardly thereof. Shaft 42 and socket 44 are disposed axially of the cylinder 41. Stub shaft 42 is journaled in the bearing 35 and the stem portion 39 fits non-rotatably in the socket 44 so that the cylinder 41 is rotatably mounted in the casing 13 and is supported by the bearing 35 and the stem 36 which are eccentrically disposed relative to the axis of the casing 13, as seen in FIGURES 4 and 1, respectively.

As seen in FIGURES 2 and 3, the cylinder 41 has a recess 45 which extends diametrically therethrough and which is of a substantial width and length. Each end of the recess 45 has a guide composed of spaced apart substantially parallel walls 46 (FIGURES 2 and 5). A pin 47 projects into each of said guides between its walls 46. A rectangular soap cake chamber 48 is detachably mounted in recess 45 and is composed of side walls 49 and end walls 50. The chamber 48 has an open bottom 51 and an open top 52. The chamber 48 has corrugations formed on its side and end walls and internally thereof, and which corrugations 53 extend between its open bottom 51 and open top 52 and have beveled ends 54.

A slide 55 composed of spaced substantially parallel walls is mounted externally of each end wall 50 and is sized to fit slidably between a pair of the guide walls 46. A leaf spring 56 is secured adjacent one end thereof by a fastening 57 to the outer side of each end wall 50 and within and longitudinally of its slide 55. Each spring 56 has an offset free end portion provided with an opening 58 to receive the pin 47 of the guide 46 in which said spring is disposed for latching the chamber 48 in the recess 45.

One end of the cylinder 41 has an annular rib 59 (FIGURES 2, 4 and 5) which is disposed concentrically around the stub shaft 42 and which is provided with six equally spaced outwardly opening V-shaped notches 60. One end of a leaf spring 61 is secured by fastenings 62 to the inner side of the end wall 33. A small wheel 63 is journaled in the opposite end of the spring 61 to ride on the outer edge of the rib 59 and to seat successively in the notches 60. A screw 64 extends threadedly through the wall 33 and bears adjustably against the spring 61 to vary the tensions with which said spring holds the wheel 63 against the rib 59 or in engagement with the notches 60.

A back shield 65 is disposed in the casing 13 between the member 14 and the cylinder 41 and extends substantially from end-to-end of the cylinder 41. The back shield includes a plurality of bars 66 which are disposed crosswise of the shield and secured on cross battens 67. The bars 66 are of square cross section, except at their upper ends, and each has one longitudinal edge facing toward the cylinder 41. The upper ends of the bars 66 are flat and are turned back upon themselves to form hooks 68 which engage in a recess 69, formed in the upper longitudinal edge of the member 14, suspending the shield 65 therefrom. An arm 70 is hinged at 71 to the underside of the lower end of each bar 66. The arms 70 extend substantially radially outward from their hinges 71 and have outturned terminals 72 which engage in the recess 27, formed under the edge of the plate 25 which is disposed in said recess. The inner side of plate 25 may be provided, adjacent said edge, with an internal enlargement 73 against which the arms 70 abut for retaining the ends 72 thereof in the recess 27 when the plate 25 is in an applied position, as seen in FIGURE 3.

A drainage receptacle 74 is mounted on the plate 25 between the arms 70 and a corrugated roller 75. The roller 75 is disposed above the frame portion 24 and between said frame portion and the cylinder 41. The roller 75 preferably extends substantially from end-to-end of the casing 13 and end portions of its shaft 76 may be journaled in the end walls 33 and 34, as seen in FIGURES 4 and 1, respectively.

A soap cake or bar supporting platform 77 is disposed in the drain pan 74 and beneath the bottom portion of the cylinder 41. The platform 77, like the pan 74, extends from end-to-end of the recess 45, as seen in FIGURE 2. The platform 77 is composed of a plurality of spaced cross bars 78 which are mounted on and secured to battens 79 and 80 which extend from end-to-end of the platform. The cross bars 78 are of square cross section with one edge of each facing upwardly and the bars 78 are bowed downwardly from end-to-end thereof, as seen in FIGURE 3. The bars 66 are similarly bowed but to a lesser extent. The upper ends of the bars 78 form continuations of the lower ends of the bars 66. The lower ends of the bars 78, which terminate adjacent the roller 75, are curved upwardly as seen at 81. The bottom edges of the battens 79 and 80 rest on the inner side of the bottom of the drain pan 74. The center batten 80 has a downwardly opening threaded socket 82 which aligns with openings 83 of the plate 25 and the bottom of the drain pan to receive the threaded shank of a thumb screw 84 which extends inwardly therethrough and is threadedly anchored in the socket 82.

As seen in FIGURES 2 and 9, a detachable end wall 34 has an inturned annular flange 85 which is provided with circumferentially spaced bayonet slots 86'. The flange 85 fits into the casing 13 which has inwardly projecting studs 87' which are received in the slots 86' for locking the end wall 34 to the casing 13 by a slight twisting action in one direction.

As seen in FIGURE 3, the cylinder 41 is disposed with the bottom 51 of the soap chamber 48 directly above the platform 77 so that the lower end of a cake of soap, as indicated by broken lines at 86, rests upon edges of the platform rods 78. This constitutes a storing position of the soap cake 86 and it will be readily apparent that moisture thereon will drain through the platform 77 into the pan 74. With the cylinder 41 thus disposed, the wheel 63 is in engagement with one of the notches 60, as seen in FIGURES 2, 4 and 5. When it is desired to use the soap cake 86, the knob 40 is rotated clockwise, as seen in FIGURE 1, through an arc of 60° so that the inner cylinder 41 turns through an arc such that the open bottom 51 moves from a broken line 87, which is disposed perpendicular to said bottom and which passes through the platform 77, to a broken line 88 which is disposed perpendicular to the bottom 51 after it is turned through its aforementioned arc of 60° and which line 88 extends radially downward and outward from the longitudinal center of the cylinder 41 through the lower opening of the frame 19, which is disposed between the partition 23 and bottom flange 21 and which opening 89 constitutes the discharge opening of the holder 12. During the aforementioned clockwise movement of the cylinder 41, the leading wall 49 initially moves away from the soap cake 86 after which the trailing wall 49 engages and moves the soap cake from right to left of FIGURE 3. The bottom of the soap cake is initially deflected upwardly into engagement with the periphery of the corrugated roller 75 by the upturned bar ends 81. The rollers 75 is revolved counterclockwise by contact with the soap cake to elevate said soap cake and to cause it to pass thereover before the cylinder 41 completes its 60° of rotational movement. As soon as the soap cake passes over the roller 75 it will be discharged by gravity through the opening 89 into the hand of the person who is to use the soap. The wheel 63 will then move into engagement with the next notch 60 for holding the cylinder 41 turned 60° clockwise from its position of FIGURE 3 or in its discharging position.

The cylinder 41 is then turned another 60° in the same direction so that the soap chamber bottom 51 will be in registration with the upper frame opening 90 which is located between the top flange 20 and partition 23, and with the bottom 51 disposed perpendicular to a broken line 91 which extends radially from the center of the cylinder 41 through the opening 90 and which is inclined downwardly and inwardly. In this the loading position of the cylinder 41, the soap cake 86 after use is reinserted into the chamber 48 through the opening 90 and will slide sufficiently through the open top 52, which has then become the chamber bottom, so that the lower end of the cake 86 will rest against the bars 66 of the shield 65. The wheel 63 by engagement with the next notch 60 will latch the cylinder 41 in this third loading position, as indicated by the line 91.

The cylinder 41 is then turned another 60° clockwise to complete a half revolution back to its storing position of FIGURE 3, as indicated by the line 87, wherein the original open chamber top 52 has become the open bottom of the chamber 48. It will be apparent that in the storing position a peripheral portion of the cylinder 41 will close the discharge opening 89 and the loading opening 90.

From the foregoing, it will be apparent that the aforedescribed operations of storing, discharging and loading are accomplished twice during each complete revolution of the cylinder 41 which is releasably latched twice in each of said aforementioned positions. The thumb screw 31 may be loosened to move the clamp 28 away from the member 14 to permit removal of the plate 25, drain pan 74 and platform 77 for cleaning, and these parts may be separated from one another by removal of the screw 84 for more effectively cleaning the parts. The soap chamber 48 can be removed through the opening formed in the bottom of the casing 13 by removal of the plate 25, by positioning the inner cylinder 41 with the free ends of the springs 56 extending downwardly, rather than upwardly as seen in FIGURE 2, to disengage the springs from the pins 47. Cleaning of the soap chamber 48 can then be accomplished without removing the cylinder 41 from the casing 13.

All parts of the holder 12, except the back shield 65, or at least all of the other parts which come in contact with the soap 86 are preferably formed of a material to which the soap will not adhere, such as a plastic. The back shield 65, which the soap may forcibly strike when it is inserted into the chamber 48, is preferably formed of a more substantial material such as chrome or stainless steel.

Various modifications and changes are contemplated and may obviously be resorted to without departing from the function or scope of the invention, as hereinafter defined by the appended claims.

I claim as my invention:

1. A soap cake holder and dispenser comprising a casing, a cylinder mounted for rotation in said casing about a substantially horizontal axis, said cylinder having a recess opening radially outward thereof and adapted to contain a cake of soap, said casing having an outwardly and downwardly inclined discharge opening disposed to align with the recess in one position of rotation of the cylinder and a loading opening disposed above the discharge opening, manually actuated means for rotating the cylinder to move the recess into alignment with the discharge opening for gravity discharging the soap cake from the cylinder through the discharge opening and for thereafter turning the cylinder to bring the recess into registration with the loading opening to permit return of the soap cake to the recess.

2. A soap cake holder and dispenser as in claim 1, a soap cake supporting platform mounted in the casing beneath said cylinder and on which the soap cake is adapted to rest when the cylinder is in a storing position with said recess opening above the platform, said platform including a top portion composed of spaced apart rods extending circumferentially of the cylinder, and a drainage receptacle mounted in the casing beneath the platform to collect moisture draining from the soap cake.

3. A soap cake holder and dispenser as in claim 2, said casing including a removable bottom section disposed beneath and supporting the drainage receptacle and platform.

4. A soap cake holder and dispenser as in claim 1, a soap cake supporting platform of open work construction mounted in the casing beneath said cylinder and on which the soap cake is adapted to rest when the cylinder is in a storing position with said recess opening above the platform, and means for releasably latching said cylinder in its storing, discharging and loading positions.

5. A soap cake holder and dispenser as in claim 1, a soap cake supporting platform mounted in the casing beneath said cylinder and on which the soap cake is adapted to rest when the cylinder is in a storing position with said recess opening above the platform, said recess extending diametrically through the cylinder and having open opposite ends, said platform, discharge opening and loading opening covering a circumferential area corresponding to one-half the circumference of the cylinder whereby when the cylinder is rotated in one direction through an arc of 360° it will twice assume a storing position, a discharging position and a loading position.

6. A soap cake holder and dispenser as in claim 5, a liner detachably mounted in said recess and forming a soap cake chamber having open sides opening through the ends of said recess and internal corrugations extending perpendicular to said open sides.

7. A soap cake holder and dispenser as in claim 1, a soap cake supporting platform mounted in the casing beneath said cylinder and on which the soap cake is adapted to rest when the cylinder is in a storing position with said recess opening above the platform, and a back shield of open work construction mounted in a rear part of said casing substantially in alignment with the loading opening, said platform being disposed between the back shield and said discharge opening.

8. A soap cake holder and dispenser as in claim 7, a corrugated roller journaled for free rotation in said casing lengthwise of the cylinder and between the platform and discharge opening and adapted to be engaged by the soap cake for deflecting the soap cake from the platform into the discharge opening as the cylinder is rotated from a storing to a discharging position.

References Cited
UNITED STATES PATENTS

| | | | |
|---|---|---|---|
| 1,820,517 | 8/1931 | Wells | 312—97.1 |
| 2,315,515 | 4/1943 | Gibson et al. | |
| 2,513,595 | 7/1950 | Stewart | 312—46 |

ROY D. FRAZIER, *Primary Examiner.*

J. F. FOSS, *Assistant Examiner.*